United States Patent
Guo et al.

(10) Patent No.: US 12,389,228 B2
(45) Date of Patent: Aug. 12, 2025

(54) ATTACK PREVENTION METHOD FOR DEALING WITH AUTHENTICATION FLOODING ATTACK, ASSOCIATION FLOODING ATTACK, AND/OR REASSOCIATION FLOODING ATTACK AND ACCESS POINT USING THE SAME

(71) Applicant: MEDIATEK INC., Hsin-Chu (TW)

(72) Inventors: Ming-Wang Guo, Hsinchu (TW); Santwana Panigrahy, Uttar Pradesh (IN)

(73) Assignee: MEDIATEK INC., Hsinchu (TW)

( * ) Notice: Subject to any disclaimer, the term of this patent is extended or adjusted under 35 U.S.C. 154(b) by 193 days.

(21) Appl. No.: 17/991,767

(22) Filed: Nov. 21, 2022

(65) Prior Publication Data

US 2023/0180006 A1   Jun. 8, 2023

(30) Foreign Application Priority Data

Dec. 2, 2021 (IN) .............................. 202121055885

(51) Int. Cl.
*H04W 12/122*   (2021.01)
*H04W 12/062*   (2021.01)

(52) U.S. Cl.
CPC ....... *H04W 12/122* (2021.01); *H04W 12/062* (2021.01)

(58) Field of Classification Search
CPC .................... H04W 12/122; H04W 12/062
See application file for complete search history.

(56) References Cited

U.S. PATENT DOCUMENTS

| | | |
|---|---|---|
| 2007/0025313 A1 | 2/2007 | Bhagwat |
| 2007/0050618 A1 | 3/2007 | Roux |
| 2011/0237281 A1* | 9/2011 | Busropan ................ H04L 67/02 455/507 |
| 2013/0042301 A1* | 2/2013 | Mahamuni .......... H04W 12/062 726/3 |
| 2014/0105196 A1 | 4/2014 | Seok |
| 2014/0347985 A1* | 11/2014 | Yi ......................... H04W 76/10 370/230 |
| 2021/0227469 A1 | 7/2021 | Kim |
| 2021/0320831 A1* | 10/2021 | Park .................... H04L 27/2621 |

FOREIGN PATENT DOCUMENTS

CN            101141259 A        3/2008

\* cited by examiner

*Primary Examiner* — Quazi Farooqui
(74) *Attorney, Agent, or Firm* — Winston Hsu

(57) ABSTRACT

An attack prevention method includes: receiving an authentication request frame; and in response to receiving the authentication request frame, replying with an authentication response frame that is sent to a non-access-point (non-AP) station (STA), wherein the authentication request frame includes a timeout interval element that carries Authentication Comeback time. Another attack prevention method includes: ignoring each specific request frame that is received within a period in which a connected non-AP STA operates under a power saving mode, wherein each specific request frame includes one of an authentication request frame, an association request frame, and a reassociation request frame.

12 Claims, 3 Drawing Sheets

ATTACK PREVENTION METHOD FOR DEALING WITH AUTHENTICATION FLOODING ATTACK, ASSOCIATION FLOODING ATTACK, AND/OR REASSOCIATION FLOODING ATTACK AND ACCESS POINT USING THE SAME

BACKGROUND

The present invention relates to wireless communications, and more particularly, to an attack prevention method for dealing with authentication flooding attack, association flooding attack, and/or reassociation flooding attack and an access point using the attack prevention method.

There are three types of 802.11 frames, including management frames, control frames, and data frame. Management frames, such as authentication, deauthentication, association request, reassociation request frames, are used by wireless clients to find and connect to the right Wi-Fi network and manage the client connection after a successful association. Without the Protected Management Frames (PMF) feature, all management frames are sent unprotected in the open area. Transmitting unprotected frames make connections vulnerable to attack. PMF is a feature that provides integrity protection for both unicast and broadcast management frames, and also encrypts unicast management frames in the same way as data to provide confidentiality. However, the PMF standard does not have clear definition for how to prevent the authentication request flooding issue. As a result, an access point (AP) may frequently send Security Association (SA) Query requests to a non-AP station (STA) to check if the non-AP STA is alive. In addition, there may be an IOT issue between the AP and connected non-AP STA(s) for preventing the authentication flooding attack.

Moreover, a non-AP STA may enter a power saving mode after a connection between an AP and the non-AP STA is established successfully. The non-AP STA in the power saving mode will not send authentication request, association request, and/or reassociation request frames to the AP. However, the PMF standard does not have clear definition for the AP to process the authentication request, association request, and/or reassociation request frames when the non-AP STA operates under the power saving mode.

SUMMARY

One of the objectives of the claimed invention is to provide an attack prevention method for dealing with authentication flooding attack, association flooding attack, and/or reassociation flooding attack and an access point using the attack prevention method.

According to a first aspect of the present invention, an exemplary attack prevention method is disclosed. The exemplary attack prevention method includes: receiving an authentication request frame; and in response to receiving the authentication request frame, replying with an authentication response frame that is sent to a non-access-point (non-AP) station (STA), wherein the authentication request frame comprises a timeout interval element that carries Authentication Comeback time.

According to a second aspect of the present invention, an exemplary attack prevention method is disclosed. The exemplary attack prevention method includes: ignoring each specific request frame that is received within a period in which a connected non-access-point (non-AP) station (STA) operates under a power saving mode, wherein said each specific request frame comprises one of an authentication request frame, an association request frame, and a reassociation request frame.

According to a third aspect of the present invention, an exemplary access point (AP) with attack prevention is disclosed. The exemplary AP with attack prevention includes a network interface circuit and a control circuit. The network interface circuit is arranged to receive an authentication request frame. The control circuit is arranged to generate an authentication response frame in response to the authentication request frame, and instruct the network interface circuit to send the authentication response frame to a non-access-point (non-AP) station (STA), wherein the authentication request frame comprises a timeout interval element that carries Authentication Comeback time.

According to a fourth aspect of the present invention, an exemplary access point (AP) with attack prevention is disclosed. The exemplary AP with attack prevention includes a network interface circuit and a control circuit. The control circuit is arranged to ignore each specific request frame that is received by the network interface circuit within a period in which a connected non-access-point (non-AP) station (STA) operates under a power saving mode, wherein said each specific request frame comprises one of an authentication request frame, an association request frame, and a reassociation request frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
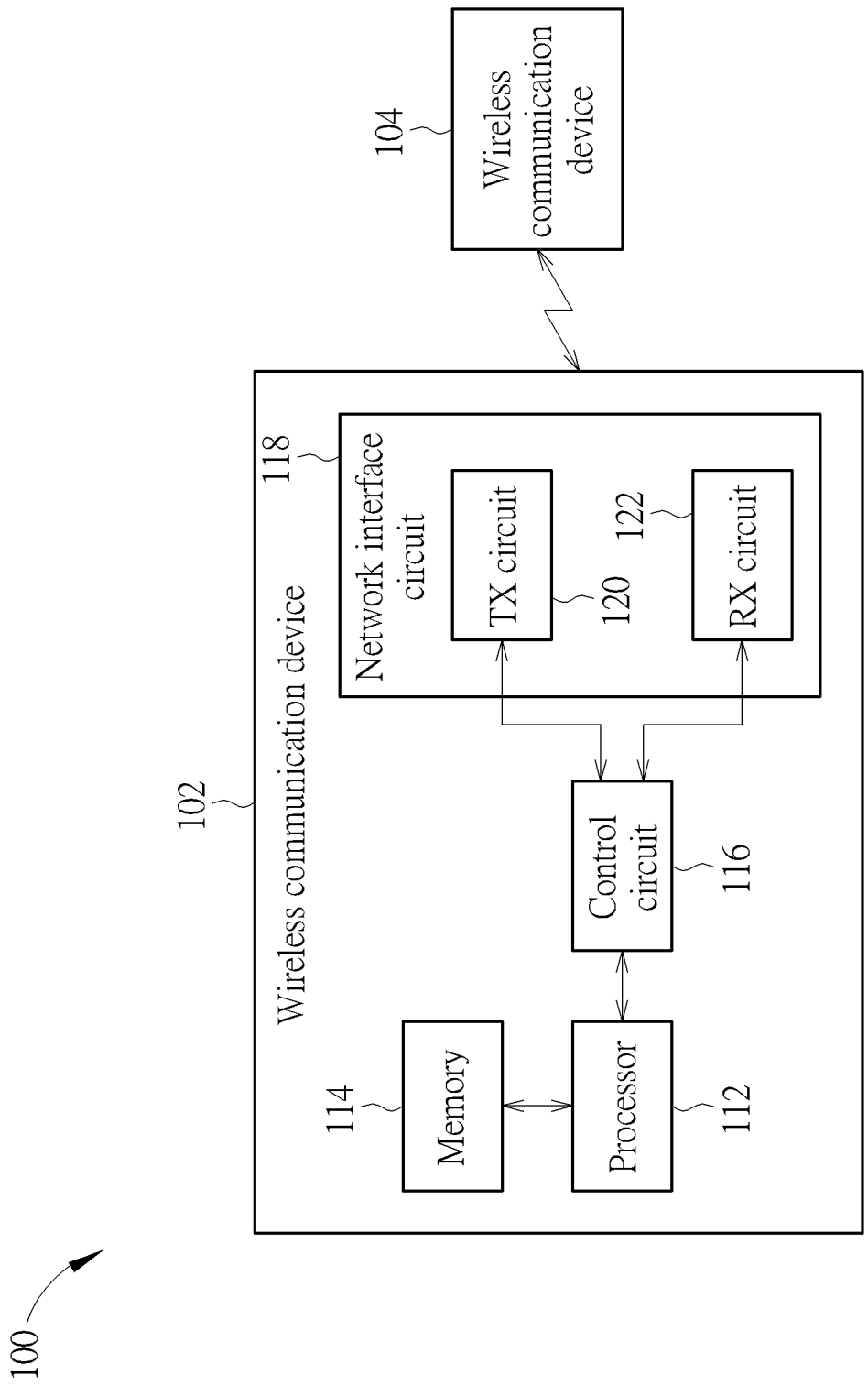
FIG. 1 is a diagram illustrating a wireless communication system according to an embodiment of the present invention.

FIG. 1 is a diagram illustrating a wireless communication system according to an embodiment of the present invention. The wireless communication system 100 includes a plurality of wireless communication devices 102 and 104. For example, the wireless communication system 100 is a wireless fidelity (Wi-Fi) system, including an access point (AP) and a non-AP station (STA). In one embodiment of the present invention, the wireless communication device 102 is an AP, and the wireless communication device 104 is a non-AP STA. The proposed attack prevention scheme can be employed by the AP. For brevity and simplicity, only two wireless communication devices 102 and 104 are shown in FIG. 1. In practice, the wireless communication system 100 is allowed to have more than two wireless communication devices, including an AP and more than one non-AP STA in the same basic service set (BSS).

The wireless communication device 102 includes a processor 112, a memory 114, a control circuit 116, and a network interface circuit 118, where the network interface circuit 118 includes a transmitter (TX) circuit 120 and a receiver (RX) circuit 122. The memory 114 is arranged to store a program code. The processor 112 is arranged to load and execute the program code to manage the wireless communication device 102. The control circuit 116 is arranged to control wireless communications with the wireless communication device 104. Since the wireless communication device 102 is an AP and the wireless communication device 104 is a non-AP STA, the control circuit 116 controls the TX circuit 120 of the network interface circuit 118 to deal with downlink (DL) traffic between AP and non-AP STA, and controls the RX circuit 122 of the network interface circuit 118 to deal with uplink (UL) traffic between AP and non-AP STA.

It should be noted that only the components pertinent to the present invention are illustrated in FIG. 1. In practice, the wireless communication device 102 may include additional components to achieve designated functions.

In this embodiment, the wireless communication device 102 is an AP that can support a first attack prevention feature for dealing with authentication flooding attack within a timeout period specified by Authentication Comeback time, and/or a second attack prevention feature for dealing with authentication flooding attack, association flooding attack, and/or reassociation flooding attack within a period in which the wireless communication device 104 (which is a non-AP STA) operates under a power saving mode. Further details of the proposed first and second attack prevention schemes are described with reference to the accompanying drawings.

Figure 2:
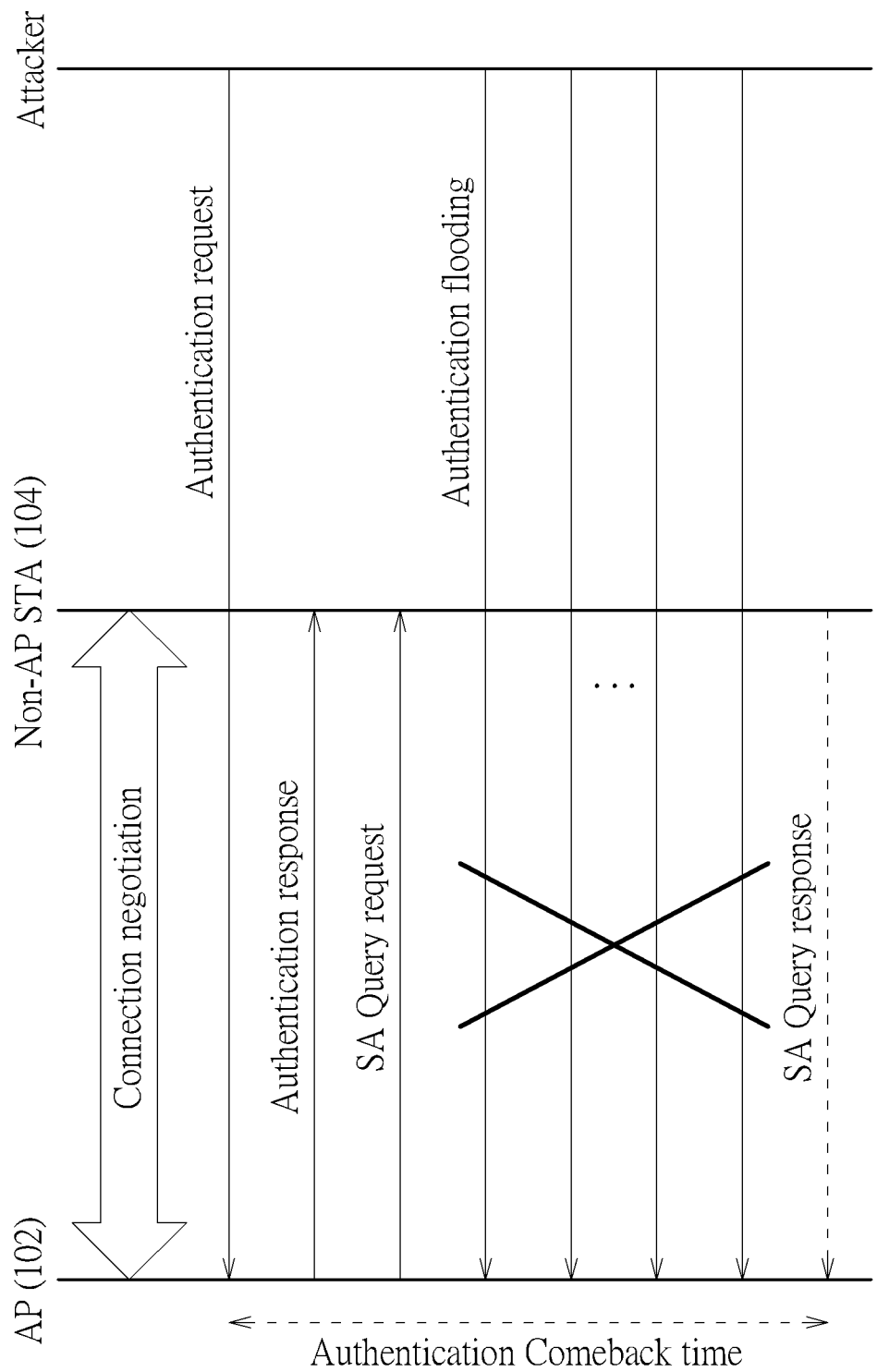
FIG. 2 is a sequence diagram illustrating process interactions of a first attack prevention scheme employed by an AP according to an embodiment of the present invention.

Please refer to FIG. 1 in conjunction with FIG. 2. FIG. 2 is a sequence diagram illustrating process interactions of a first attack prevention scheme employed by an AP according to an embodiment of the present invention. In the wireless communication system (e.g., Wi-Fi system) 100 shown in FIG. 1, the wireless communication device 102 is an AP, and the wireless communication device 104 is a non-AP STA. In the following, the terms "wireless communication device 102" and "AP 102" may be interchangeable, and the terms "wireless communication device 104" and "non-AP 104" may be interchangeable. A connection negotiation procedure is initiated between the AP 102 and the non-AP STA 104. For example, the connection negotiation procedure may include an authentication flow, an association flow, and an extensible authentication protocol over local area network (EAPOL) flow. After the non-AP STA 104 is successfully connected to the AP 102, the network interface circuit 118 of the AP 102 (particularly, RX circuit 122 of network interface circuit 118) receives an authentication request frame. In this example, the authentication request frame is sent from an attacker rather than the connected non-AP STA 104. The control circuit 116 of the AP 102 is arranged to generate an authentication response frame in response to the authentication request frame, and instruct the network interface circuit 118 (particularly, TX circuit 120 of network interface circuit 118) to send the authentication response frame to the non-AP STA 104. In this embodiment, a frame body of the authentication response frame may include a Reason Code field and a Timeout Interval element (TIE), where the Reason Code field is used to indicate the reason that the authentication response frame is generated, and the TIE is used to carry Authentication Comeback time that specifies a timeout period.

The control circuit 116 of the AP 102 is further arranged to ignore each authentication request frame that is received by the network interface circuit 118 (particularly, RX circuit 122 of network interface circuit 118) within the timeout period specified by the Authentication Comeback time (which is carried by the authentication response frame sent in response to the authentication request frame from the attacker). For example, before the timeout period expires, the control circuit 116 directly drops any received authentication request frame without processing payload of the received authentication request frame. In this way, the AP resource can be saved. For another example, before the timeout period expires, the control circuit 116 does not generate one authentication response frame in response to any received authentication request frame. In this way, unnecessary authentication response frame is prevented from occupying the wireless medium resource. As shown in FIG. 2, the proposed first attack prevention scheme protects the AP 102 against the authentication flooding attack from the attacker within the timeout period specified by the Authentication Comeback time.

Furthermore, the control circuit 116 of the AP 102 is further arranged to generate a Security Association (SA) Query request frame and instruct the network interface circuit 118 (particularly, TX circuit 120 of network interface circuit 118) to send the SA Query request frame to the non-AP STA 104 within the timeout period specified by the Authentication Comeback time. The non-AP STA 104 that supports an SA Query procedure and receives an SA Query request frame shall respond with an SA Query response frame unless the non-AP STA 104 is not alive (i.e., not currently associated to the AP 102 that sent the SA Query Request frame). In a case where an SA Query response frame with correct Transaction identifier (ID) from the non-AP STA 104 is received by the network interface circuit 118 (particularly, RX circuit 122 of network interface circuit 118) within the timeout period specified by the Authentication Comeback time, the control circuit 116 keeps connection with the non-AP STA 104. In another case where an SA Query response frame with correct Transaction ID from the non-AP STA 104 is not received by the network interface circuit 118 (particularly, RX circuit 122 of network interface circuit 118) within the timeout period specified by the Authentication Comeback time, the control circuit 116 generates a deauthentication frame for terminating a Wi-Fi connection, and instructs the network interface circuit 118 (particularly, TX circuit 120 of network interface circuit 118) to send the deauthentication frame to the non-AP STA 104.

As shown in FIG. 2, the first attack prevention scheme has an explicit flow to handle authentication flooding attack, and can prevent the IOT issue between AP and connected non-AP STA(s).

Figure 3:
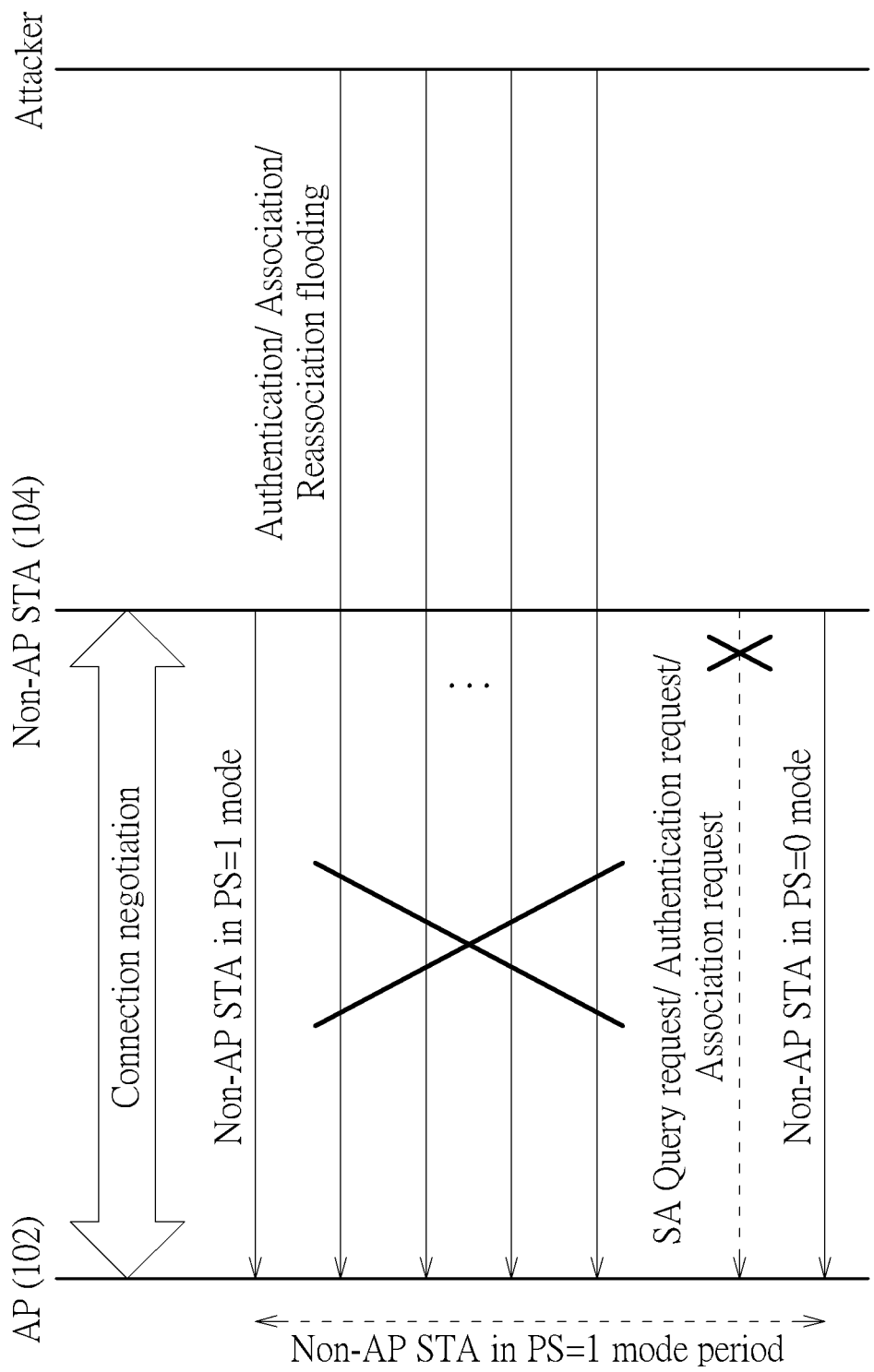
FIG. 3 is a sequence diagram illustrating process interactions of a second attack prevention scheme employed by an AP according to an embodiment of the present invention.

Please refer to FIG. 1 in conjunction with FIG. 3. FIG. 3 is a sequence diagram illustrating process interactions of a second attack prevention scheme employed by an AP according to an embodiment of the present invention. In the wireless communication system (e.g., Wi-Fi system) 100 shown in FIG. 1, the wireless communication device 102 is an AP, and the wireless communication device 104 is a non-AP STA. In the following, the terms "wireless communication device 102" and "AP 102" may be interchangeable, and the terms "wireless communication device 104" and "non-AP 104" may be interchangeable. A connection negotiation procedure is initiated between the AP 102 and the non-AP STA 104. For example, the connection negotiation procedure may include an authentication flow, an association flow, and an EAPOL flow. After the non-AP STA 104 is successfully connected to the AP 102, the non-AP STA 104 may enter a power saving mode (PS=1) under a condition that there is no data to be transmitted by the non-AP STA 104. For example, the non-AP STA 104 may send a frame to the AP 102 for indicating that the non-AP STA 104 operates in the power saving mode. The control circuit 116 of the AP 102 is arranged to ignore each specific request frame (e.g., authentication request frame, association request frame, or reassociation request frame) that is received by the network interface circuit 118 (particularly, RX circuit 122 of network interface circuit 118) within a period in which the connected non-AP STA 104 operates under the power saving mode. Since the non-AP STA 104 enters the power saving mode, the non-AP STA 104 will not send any of an authentication request frame, an association request frame, and a reassociation request frame to the AP 102. Hence, authentication request, association request, and/or reassociation request frames received by the AP 102 within the period in which the connected non-AP STA 104 operates under the power saving mode are treated as flooding attack from an attacker.

For example, the control circuit 116 directly drops any authentication/association/reassociation request frame that is received within the period in which the connected non-AP STA 104 operates under the power saving mode (i.e., before the non-AP STA 104 leaves the power saving mode (PS=0)), without processing payload of the received authentication/association/reassociation request frame. In this way, the AP resource can be saved. For another example, the control circuit 116 does not generate a specific frame in response to any authentication/association/reassociation request frame that is received within the period in which the connected non-AP STA 104 operates under the power saving mode (i.e., before the non-AP STA 104 leaves the power saving mode (PS=0)), where the specific frame may be one of an authentication response frame, an association response frame, a reassociation response frame, and an SA Query request frame. In this way, unnecessary authentication response frame/association response frame/reassociation response frame/SA Query request frame is prevented from occupying the wireless medium resource. Furthermore, since the non-AP STA 104 in the power saving mode is unable to reply with an SA Query response frame, the second attack prevention scheme that blocks the AP 102 from sending an SA Query request frame can prevent the AP 102 from terminating a Wi-Fi connection between AP 102 and non-AP STA 104 unexpectedly.

As shown in FIG. 3, the second attack prevention scheme protects the AP 102 against the authentication/association/reassociation flooding attack from the attacker within the period in which the non-AP STA 104 operates under the power saving mode. Specifically, the second attack prevention scheme has an explicit flow to handle authentication/association/reassociation flooding attack under a condition that the connected non-AP STA operates under the power saving mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An attack prevention method comprising:
    receiving an authentication request frame;
    in response to receiving the authentication request frame, replying with an authentication response frame that is sent to a non-access-point (non-AP) station (STA), wherein the authentication request frame comprises a timeout interval element that carries Authentication Comeback time; and
    within a timeout period specified by the Authentication Comeback time, sending a Security Association (SA) Query request frame to the non-AP STA or ignoring each authentication request frame that is received within the timeout period.

2. The attack prevention method of claim 1, wherein ignoring said each authentication request frame that is received within the timeout period specified by the Authentication Comeback time comprises:
    dropping said each authentication request frame without processing payload of said each authentication request frame.

3. The attack prevention method of claim 1, wherein ignoring said each authentication request frame that is received within the timeout period specified by the Authentication Comeback time comprises:
    not replying with one authentication response frame in response to said each authentication request frame.

4. The attack prevention method of claim 1, further comprising:
    within the timeout period specified by the Authentication Comeback time, keeping connection with the non-AP STA in response to receiving an SA Query response frame with correct Transaction identifier (ID) from the non-AP STA.

5. The attack prevention method of claim 1, further comprising:
    sending a deauthentication frame to the non-AP STA in response to not receiving an SA Query response frame with correct Transaction identifier (ID) from the non-AP STA within the timeout period specified by the Authentication Comeback time.

6. An attack prevention method comprising:
    ignoring each specific request frame that is received within a period in which a connected non-access-point (non-AP) station (STA) operates under a power saving mode;
    wherein said each specific request frame comprises one of an authentication request frame, an association request frame, and a reassociation request frame; and
    wherein ignoring said each specific request frame that is received within the period in which the connected non-AP STA operates under the power saving mode comprises:
    dropping said each specific request frame without processing payload of said each specific request frame.

7. The attack prevention method of claim 6, wherein ignoring said each specific request frame that is received within the period in which the connected non-AP STA operates under the power saving mode further comprises:
    not replying with a specific frame in response to said each specific request frame, wherein the specific frame comprises one of an authentication response frame, an association response frame, a reassociation response frame, and a Security Association (SA) Query request frame.

8. An access point (AP) with attack prevention comprising:
- a network interface circuit, arranged to receive an authentication request frame; and
- a control circuit, arranged to generate an authentication response frame in response to the authentication request frame, and instruct the network interface circuit to send the authentication response frame to a non-access-point (non-AP) station (STA), wherein the authentication request frame comprises a timeout interval element that carries Authentication Comeback time;
- wherein the control circuit is further arranged to ignore each authentication request frame that is received within a timeout period specified by the Authentication Comeback time, or the control circuit is further arranged to generate a Security Association (SA) Query request frame and instruct the network interface circuit to send the SA Query request frame to the non-AP STA within the timeout period specified by the Authentication Comeback time.

9. The AP with attack prevention of claim 8, wherein the control circuit drops said each authentication request frame without processing payload of said each authentication request frame.

10. The AP with attack prevention of claim 8, wherein the control circuit does not generate one authentication response frame in response to said each authentication request frame.

11. The AP with attack prevention of claim 8, wherein the control circuit is further arranged to keep connection with the non-AP STA when an SA Query response frame with correct Transaction identifier (ID) from the non-AP STA is received by the network interface circuit within the timeout period specified by the Authentication Comeback time.

12. The AP with attack prevention of claim 8, wherein the control circuit is further arranged to generate a deauthentication frame and instruct the network interface circuit to send the deauthentication frame to the non-AP STA when the network interface circuit does not receive an SA Query response frame with correct Transaction identifier (ID) from the non-AP STA within the timeout period specified by the Authentication Comeback time.

* * * * *